US010038623B2

(12) United States Patent
White et al.

(10) Patent No.: US 10,038,623 B2
(45) Date of Patent: Jul. 31, 2018

(54) REDUCING FLOODING OF LINK STATE CHANGES IN NETWORKS

(71) Applicant: LinkedIn Corporation, Mountain View, CA (US)

(72) Inventors: Russell I. White, Apex, NC (US); Shafagh Zandi, San Francisco, CA (US); Zaid A. Kahn, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/332,295

(22) Filed: Oct. 24, 2016

(65) Prior Publication Data

US 2018/0115481 A1    Apr. 26, 2018

(51) Int. Cl.
*H04L 12/751* (2013.01)
*H04L 12/721* (2013.01)

(52) U.S. Cl.
CPC ............ *H04L 45/025* (2013.01); *H04L 45/12* (2013.01); *H04L 45/32* (2013.01)

(58) Field of Classification Search
CPC ........ H04L 45/025; H04L 45/12; H04L 45/32
See application file for complete search history.

(56) References Cited

U.S. PATENT DOCUMENTS

| | | | |
|---|---|---|---|
| 7,298,707 B2 | 11/2007 | Retana et al. | |
| 7,362,709 B1 * | 4/2008 | Hui | H04L 45/00 370/221 |
| 7,391,730 B1 * | 6/2008 | Chandra | H04L 45/021 370/236 |
| 2004/0174825 A1 * | 9/2004 | Li | H04L 45/02 370/254 |
| 2005/0152286 A1 * | 7/2005 | Betts | H04L 45/02 370/255 |
| 2005/0160179 A1 | 7/2005 | Retana | |
| 2008/0240118 A1 * | 10/2008 | Roy | H04L 45/02 370/400 |
| 2011/0080851 A1 * | 4/2011 | Wan | H04L 45/02 370/255 |
| 2012/0044947 A1 * | 2/2012 | Ward | H04L 45/028 370/401 |

OTHER PUBLICATIONS

PCT International Search Report and Written Opinion, European Patent Office, dated Jul. 18, 2017, Authorized Officer Koestel, Gilbert and Svet, Victor.

(Continued)

*Primary Examiner* — Christine Ng
(74) *Attorney, Agent, or Firm* — Park, Vaughan, Fleming & Dowler LLP; Chia-Hsin Suen

(57) ABSTRACT

The disclosed embodiments provide a system for transmitting a link state message in a network. During operation, the system obtains a network topology for the network. Next, the system uses the network topology to identify a reflood set of neighbors of the flooding node for reaching a set of two-hop neighbors of the flooding node. The system then transmits a link state message with an indication to reflood the link state message to the reflood set of neighbors. Finally, the system transmits the link state message without the indication to reflood to remaining neighbors of the flooding node that form a non-reflood set.

20 Claims, 6 Drawing Sheets

(56) References Cited

OTHER PUBLICATIONS

Roy et al.; "Extensions to OSPF to Support Mobile Ad Hoc Networking"; rfc5820.txt, Internet Engineering Task Force, IETF; Standard Internet Society (ISOC), Rue Des Falaises, Ch- 1205 Geneva, Switzerland, Mar. 19, 2010, pp. 1-41, XP015068238.
Clause et al.; The Optimized Link State Routing Protocol Version 2; rfc7181.txt, Internet Engineering Task Force, IETF; Standard Internet Society (ISOC) 4, Rue Des Falaises, CH- 1205 Geneva, Switzerland, Apr. 10, 2014, pp. 1-115, XP015100612.

\* cited by examiner

REDUCING FLOODING OF LINK STATE CHANGES IN NETWORKS

BACKGROUND

Field

The disclosed embodiments relate to link state protocols in networks. More specifically, the disclosed embodiments relate to techniques for reducing flooding of link state changes in networks.

Related Art

Link state protocols are commonly used in packet-switched networks to convey connectivity information among nodes in the networks. In turn, the connectivity information may be used by the nodes to construct network topologies of the networks and corresponding routing tables containing paths to destinations in the networks.

When a change in connectivity is detected in a network, the change is flooded in a link state message from the node that detected the change to all other nodes in the network. In networks with dense topologies, the link state message may be received multiple times by certain nodes, which may increase bandwidth consumption in the networks and processing overhead in the nodes.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
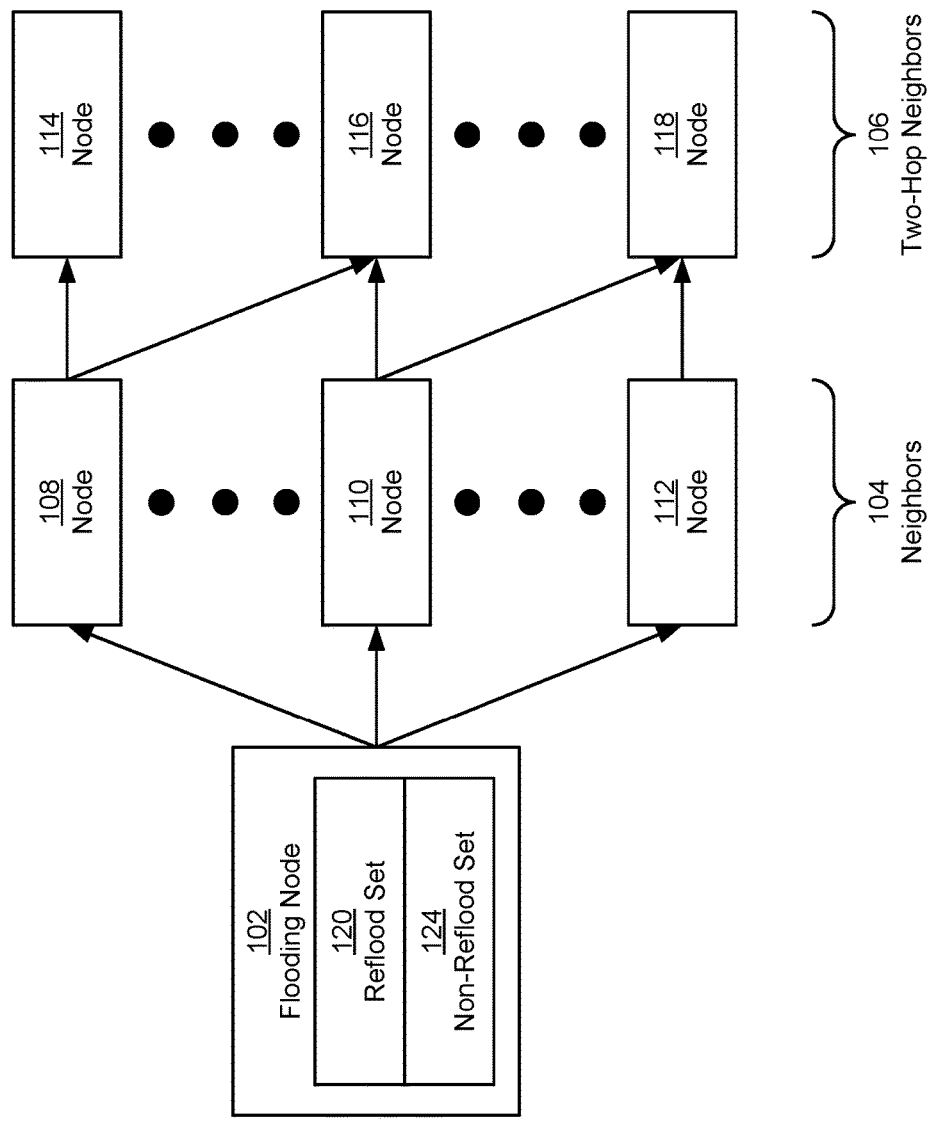
FIG. 1 shows a schematic of a system in accordance with the disclosed embodiments.

The disclosed embodiments provide a method, apparatus, and system for transmitting link state messages in a network. More specifically, the disclosed embodiments provide a method, apparatus, and system for reducing flooding of link state changes in a network. As shown in FIG. 1, the network may include a flooding node 102 that performs flooding of link state messages to nodes 108-112 in a set of neighbors 104 that are directly connected to the flooding node. In turn, some or all of the neighbors may operate as subsequent flooding nodes by reflooding the link state messages to nodes 114-118 in a set of two-hop neighbors 106 of the flooding node.

Flooding node 102 and nodes 108-118 may be routers and/or other types of switching nodes in a packet-switched network. As a result, link state messages transmitted from the flooding node to neighbors 104, and subsequently to two-hop neighbors 106, may be used by the switching nodes to update their routing tables based on changes in connectivity within the network. For example, a change in the reachability of a node, destination, and/or link in the network may be detected by the flooding node. The flooding node may use a link state protocol such as Open Shortest Path First (OSPF) and/or Intermediate System to Intermediate System (IS-IS) to flood a link state message containing the change in reachability to neighbors 104. As each neighbor receives the link state message, the neighbor may operate as the flooding node and flood the link state message to the neighbor's neighbors (i.e., two-hop neighbors of the flooding node), with the exception of the node from which the link state message was received. Flooding of the link state message may thus be used to propagate the link state message across the network. After the link state message is received at a node, the node may recalculate paths in one or more routing tables based on the change in reachability communicated in the link state message.

Those skilled in the art will appreciate that link state messages may be repeatedly received by certain nodes in networks with dense topologies. For example, a first node may flood a link state message to five neighbors. If all five neighbors are also connected to a second node, the second node may receive the same link state message five times, once from each of the neighbors. Moreover, the link state message may be circulated back from the second node through the neighbors to the first node, resulting in additional overflooding of the link state message between the first and second nodes.

In one or more embodiments, the system of FIG. 1 includes functionality to reduce flooding of link state changes in the network. More specifically, each node operating as flooding node 102 may divide its neighbors 104 into a reflood set 120 and a non-reflood set 124. Nodes in the reflood set may receive the link state message with an indication to reflood the link state message. In turn, each node in the reflood set may act as the flooding node by calculating corresponding reflood and non-reflood sets of its neighbors and transmitting the corresponding link state messages to the reflood and non-reflood sets. On the other hand, each node in the non-reflood set may receive the link state message without the indication to reflood the link state message. As a result, the node may omit reflooding of the link state message to its neighbors to reduce overflooding of the link state message in the network.

For example, flooding node 102 may select nodes 108 and 112 to be in reflood set 120 and node 110 to be in non-reflood set 124. As a result, nodes 108 and 112 may reflood the link state message to nodes 114, 116 and 118, and node 110 may omit transmission of the link state message to any two-hop neighbors 106 to reduce the number of times the link state message is received by nodes 116 and 118. In other words, the flooding node may select a subset of neighbors for subsequent reflooding of the link state message to all two-hop neighbors, as described in further detail below with respect to FIG. 2. By reducing overflooding of link state messages in the network, the system of FIG. 1 may decrease computational overhead and/or bandwidth consumption associated with repeated transmission and processing of the link state messages at the nodes.

Figure 2:
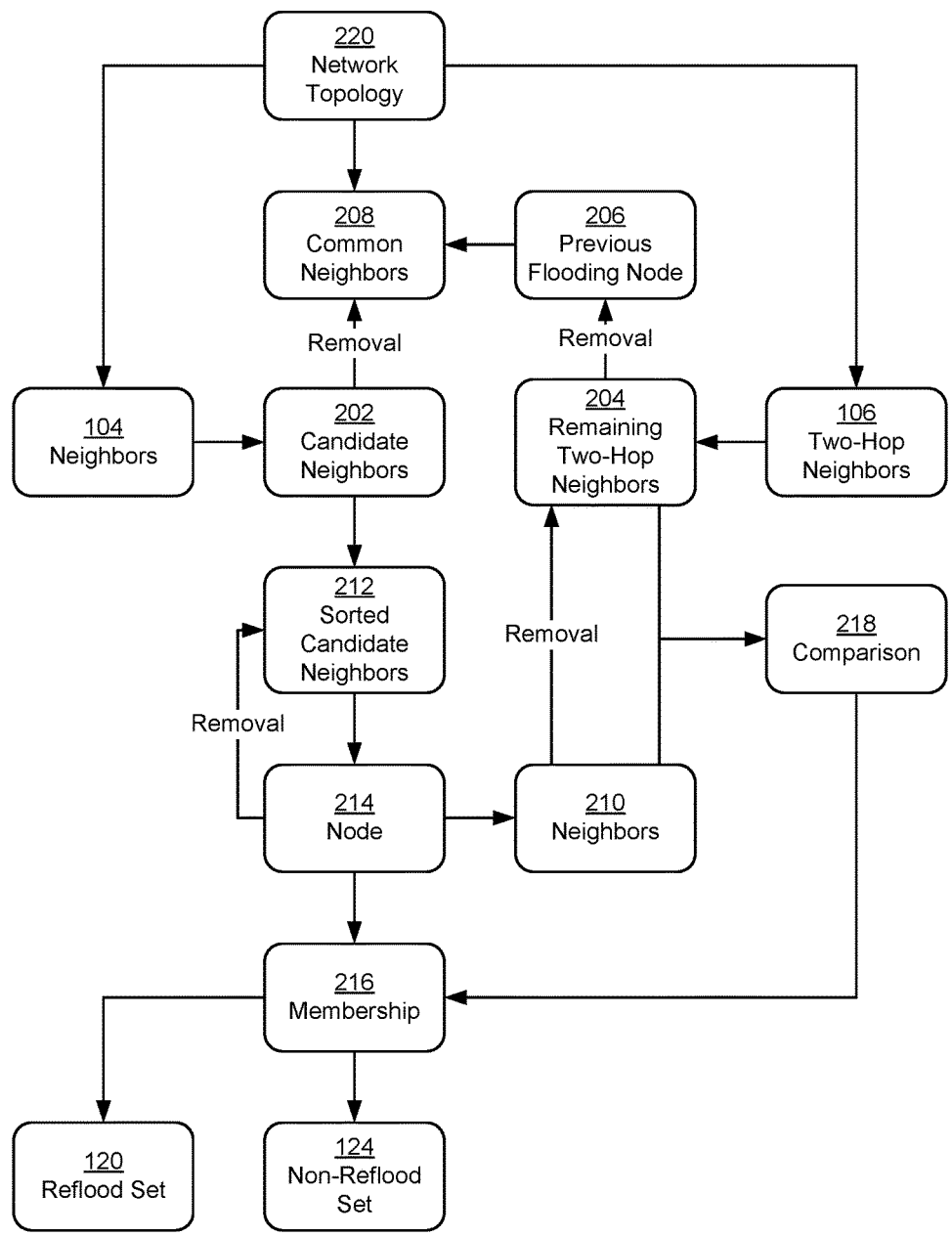
FIG. 2 shows the selection of a reflood set and a non-reflood set of neighbors for a flooding node in a network in accordance with the disclosed embodiments.

FIG. 2 shows the selection of a reflood set 120 and a non-reflood set 124 of neighbors for a flooding node (e.g., flooding node 102 of FIG. 1) in a network in accordance with the disclosed embodiments. As mentioned above, nodes in the reflood set may be selected to perform reflooding of a link state message, and nodes in the non-reflood set may be selected to omit reflooding of the link state message.

To produce reflood set 120 and non-reflood set 124, a flooding node (e.g., flooding node 102 of FIG. 1) may obtain a set of neighbors 104 and a set of two-hop neighbors 106 from a network topology 220 of the network. The network topology may be generated using an initial flood of link state messages in the network. For example, the network topology may be generated by flooding the network with a link state message from each node, which identifies all other nodes to which the node is directly connected (i.e., the node's neighbors). After every node has a complete set of link state messages from all other nodes in the network, the nodes may use the connectivity information in the link state messages to construct the network topology.

Next, the flooding node may include all neighbors 104 in a set of candidate neighbors 202, with the exception of the neighbor from which the link state message was received. The flooding node may also include all two-hop neighbors 106 in a set of remaining two-hop neighbors 204. The candidate neighbors may represent candidates for assignment to reflood set 120 or non-reflood set 124, and the remaining two-hop neighbors may represent two-hop neighbors that are not yet reachable from neighbors in the reflood set. Because the reflood set is initially empty, all two-hop neighbors may initially be included in the set of remaining two-hop neighbors.

Next, the flooding node may remove a previous flooding node 206 from remaining two-hop neighbors 204 and common neighbors 208 of the previous flooding node and remove the flooding node from candidate neighbors 202. The previous flooding node may be a two-hop neighbor from which the link routing message originated. For example, the previous flooding node may select a common neighbor with the flooding node to be in reflood set 124. After receiving the link state message with the indication to reflood from the previous flooding node, the common neighbor may select the flooding node to be in the reflood set and transmit the same link state message to the flooding node. Because the previous flooding node is known to have previously flooded the link state message to the common neighbors, the previous flooding node and common neighbors between the previous flooding node and the flooding node may be removed from the remaining two-hop neighbors and candidate neighbors, respectively, to prevent the link state message from being circulated back to the previous flooding node and common neighbors.

Previous flooding node 206 may be identified from the link state message. For example, an identifier for the previous flooding node may be included in the link state message to the flooding node. The flooding node may remove the identifier from a set of identifiers in remaining two-hop neighbors 204. The flooding node may also use network topology 220 to identify common neighbors 208 with the previous flooding node and remove the corresponding identifiers from candidate neighbors 202. Conversely, if the link state message does not include an identifier for a previous flooding node that is a two-hop neighbor of the flooding node (e.g., if the link state message is generated by the flooding node or a neighbor of the flooding node), the flooding node may maintain the current sets of candidate neighbors and remaining two-hop neighbors.

The flooding node may use candidate neighbors 202 and remaining two-hop neighbors 204 to generate reflood set 120 and non-reflood set 124. First, the flooding node may generate a set of sorted candidate neighbors 212 from candidate neighbors 202. For example, the flooding node may sort the candidate neighbors by cost and/or another router metric to produce the set of sorted candidate neighbors. Next, the flooding node may select a node 214 from sorted candidate neighbors 212. For example, the flooding node may select the first node in a list of candidate neighbors that is sorted from lowest to highest cost. After the node is selected, the node may be removed from the set of sorted candidate neighbors.

The flooding node may perform a comparison 218 of neighbors 210 of the node and remaining two-hop neighbors 204 to determine if any of the node's neighbors are in the set of remaining two-hop neighbors 204. The node's neighbors may be obtained from network topology 220 and/or the set of two-hop neighbors 106 of the flooding node. If the remaining two-hop neighbors include any neighbors of the node, the flooding node may assign a membership 216 of the node to be in reflood set 120 to allow the link state message to reach the neighbors via the node. The flooding node may also remove the neighbors from the set of remaining two-hop neighbors to indicate that the neighbors are reachable from the reflood set. If the remaining two-hop neighbors do not include any neighbors of the node, the flooding node may set the node's membership to be in non-reflood set 124 to reduce unnecessary reflooding of the link state message to the two-hop neighbors and/or other nodes in the network.

The flooding node may repeat the process of selecting a given node 214 from sorted candidate neighbors 212, using a comparison 218 of neighbors 210 of the node and remaining two-hop neighbors 204 to assign the node to be in reflood set 120 or non-reflood set 124, and removing the node from the sorted candidate neighbors until the set of remaining two-hop members is empty. At that point, the flooding node may set membership 216 of all remaining nodes in the sorted candidate neighbors to be in the non-reflood set. Consequently, the flooding node may include a subset of neighbors 104 that can be used to reach all two-hop neighbors 106 in the reflood set and all remaining neighbors in the non-reflood set. Finally, the flooding node may transmit the link state message with the indication to reflood to the reflood set and the link state message without the indication to reflood to the non-reflood set. In turn, neighbors in the reflood set may operate as the flooding node, and neighbors in the non-reflood set may omit flooding of the link state message to other nodes.

If a failure to reflood is detected in a neighbor (e.g., the neighbor does not acknowledge receipt of the link state message) in reflood set 120, the flooding node may recalculate the reflood set and non-reflood set 124 from a set of candidate neighbors 202 that does not include the neighbor. The flooding node may then transmit the link state message with the corresponding indications (e.g., flags, parameters, etc.) to reflood or not reflood to the recalculated reflood set and non-reflood set, respectively. The flooding node may also include the failure of the neighbor in the link state message. Alternatively, the flooding node may flood the link state message with the flood indication and failure of the neighbor to all neighbors. Recalculating the reflood and non-reflood sets before transmitting the link state message may improve efficiency, while flooding of the link state message with the flood indication to all neighbors may facilitate fast convergence.

The flooding node may additionally store a list of neighbors in reflood set 120 for use in flooding of subsequent link state messages in the network. In turn, the flooding node may use the stored list to transmit the subsequent link state messages with the indication to reflood to the reflood set and the subsequent link state message without the indication to reflood to remaining neighbors in non-reflood set 124. In turn, the flooding node may reduce subsequent overhead associated with recalculating the reflood and non-reflood sets. The flooding node may continue using the list to flood link state messages until a change in neighbors 104 and/or two-hop neighbors 106 is detected.

The selection process described above may be implemented using the following exemplary pseudocode:

```
// Declarations
REACHABLE == set of all two-hop neighbors, indexed by the
    neighbor through which they are reachable
CANDIDATE == set of all directly connected neighbors
REFLOOD == empty set
NON-REFLOOD == empty set
// Processing
Receive link state message
CURRENT == PREVIOUS FLOODING NODE
If (CURRENT) {
  Remove CURRENT from REACHABLE
  Remove neighbors that can reach CURRENT from CANDIDATE
}
Sort (CANDIDATE) from lowest cost to highest
While (REACHABLE is not empty) {
  CURRENT == lowest cost neighbor in CANDIDATE
  If (any neighbor of CURRENT is in REACHABLE) {
    Move CURRENT to REFLOOD
    Remove all neighbors of CURRENT from REACHABLE
  } else {
    Move CURRENT to NON-REFLOOD
  }
}
Move CANDIDATE to NON-REFLOOD
Send link state message with reflood indication to each
    neighbor in REFLOOD
Send link state message with non-reflood indication to each
    neighbor in NON-REFLOOD
```

In the above pseudocode, "REACHABLE" represents remaining two-hop neighbors 204, "CANDIDATE" represents candidate neighbors 202, and "REFLOOD" and "NON-REFLOOD" represent an empty reflood set 120 and an empty non-reflood set 124, respectively. After a link state message is received, a "CURRENT" node is set to previous flooding node 206, if the previous flooding node is specified in the link state message. If the previous flooding node exists, the previous flooding node is removed from the "REACHABLE" set, and neighbors that can reach the previous flooding node from the flooding node are removed from the "CANDIDATE" set. The "CANDIDATE" set is then sorted from lowest to highest cost.

While the "REACHABLE" set is not empty, the lowest cost neighbor in the "CANDIDATE" set is set to "CURRENT," and "CURRENT" is moved to "REFLOOD" if any neighbor of "CURRENT" is in "REACHABLE" (e.g., based on a lookup of "REACHABLE" by the index representing "CURRENT"). In turn, all neighbors of "CURRENT" are removed from "REACHABLE" (e.g., using the same lookup of "REACHABLE" by the index representing "CURRENT"). Conversely, if no neighbors of "CURRENT" are in "REACHABLE," "CURRENT" is moved to "NON-REFLOOD."

Once "REACHABLE" is empty, all remaining neighbors in "CANDIDATE" are moved to "NON-REFLOOD." Finally, link state messages with a flood indication are sent to neighbors in "REFLOOD," and link state messages with a non-reflood indication are sent to neighbors in "NON-REFLOOD."

Figure 3:
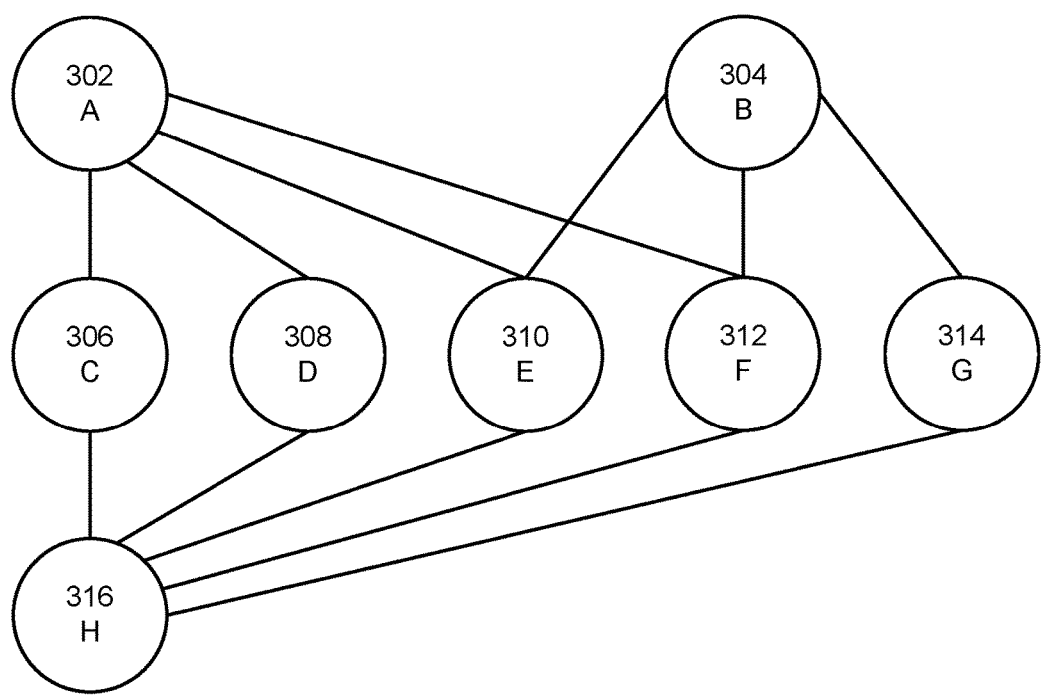
FIG. 3 shows an exemplary network topology in accordance with the disclosed embodiments.

FIG. 3 shows an exemplary network topology in accordance with the disclosed embodiments. As shown in FIG. 3, the network topology includes eight nodes 302-316. Node A 302 is connected to nodes C 306, D 308, E 310 and F 312, node B 304 is connected to nodes E 310, F 312, and G 314, and node H 316 is connected to nodes C 306, D 308, E 310, F 312, and G 314. All links between the nodes may have equal cost in the network.

The exemplary network topology of FIG. 3 may be used with the selection process of FIG. 2 to perform flooding of link state messages in the network. For example, node H 316 may initiate flooding of a link state message specifying a change of connectivity in the network. In turn, node H 316 may include nodes A 302 and B 304 in a set of remaining two-hop neighbors and nodes C 306, D 308, E 310, F 312 and G 314 in a set of candidate neighbors. Because the link state message does not have a previous flooding node, no nodes are removed from the remaining two-hop neighbors or candidate neighbors.

Next, node H 316 selects node C 306 from the set of candidate neighbors, which has one neighbor (i.e., node A 302) in the set of remaining two-hop neighbors. As a result, node A 302 is removed from the remaining two-hop neighbors, and node C 306 is moved from the candidate neighbors to the reflood set.

Node H 316 may then select node D 308 from the set of candidate neighbors. Because no neighbor of node D 308 is in the set of remaining two-hop neighbors, node D 308 is moved from the candidate neighbors to the non-reflood set.

Node H 316 may subsequently select node E 310 from the set of candidate neighbors, which has one neighbor (i.e., node B 304) in the set of remaining two-hop neighbors. In turn, node B 304 is removed from the remaining two-hop neighbors, and node E 310 is moved from the candidate neighbors to the reflood set. Because the set of remaining two-hop neighbors is empty, remaining nodes F 312 and G 314 are moved to the non-reflood set, and the link state message with the corresponding reflood and non-reflood indications is transmitted to the reflood and non-reflood sets, respectively.

Node C 306 receives the link state message with the reflood indication and floods the same link state message to node A 302. In turn, node A 302 obtains an identifier for node H 316 as the previous flooding node from the link state message. Node A 302 also includes nodes B 304 and H 316 in the set of remaining two-hop neighbors and nodes C 306, D 308, E 310, F 312, and G 314 in the set of candidate neighbors.

Because node H 316 is identified as the previous flooding node that is the two-hop neighbor of node A 302, node A 302 removes node H 316 from the remaining two-hop neighbors and all nodes C 306, D 308, E 310, F 312, and G 314, which are common neighbors with node H 316, from the set of candidate neighbors. Because the set of candidate neighbors is empty, node A 302 terminates execution without reflooding the link state message to other nodes in the network.

Figure 4:
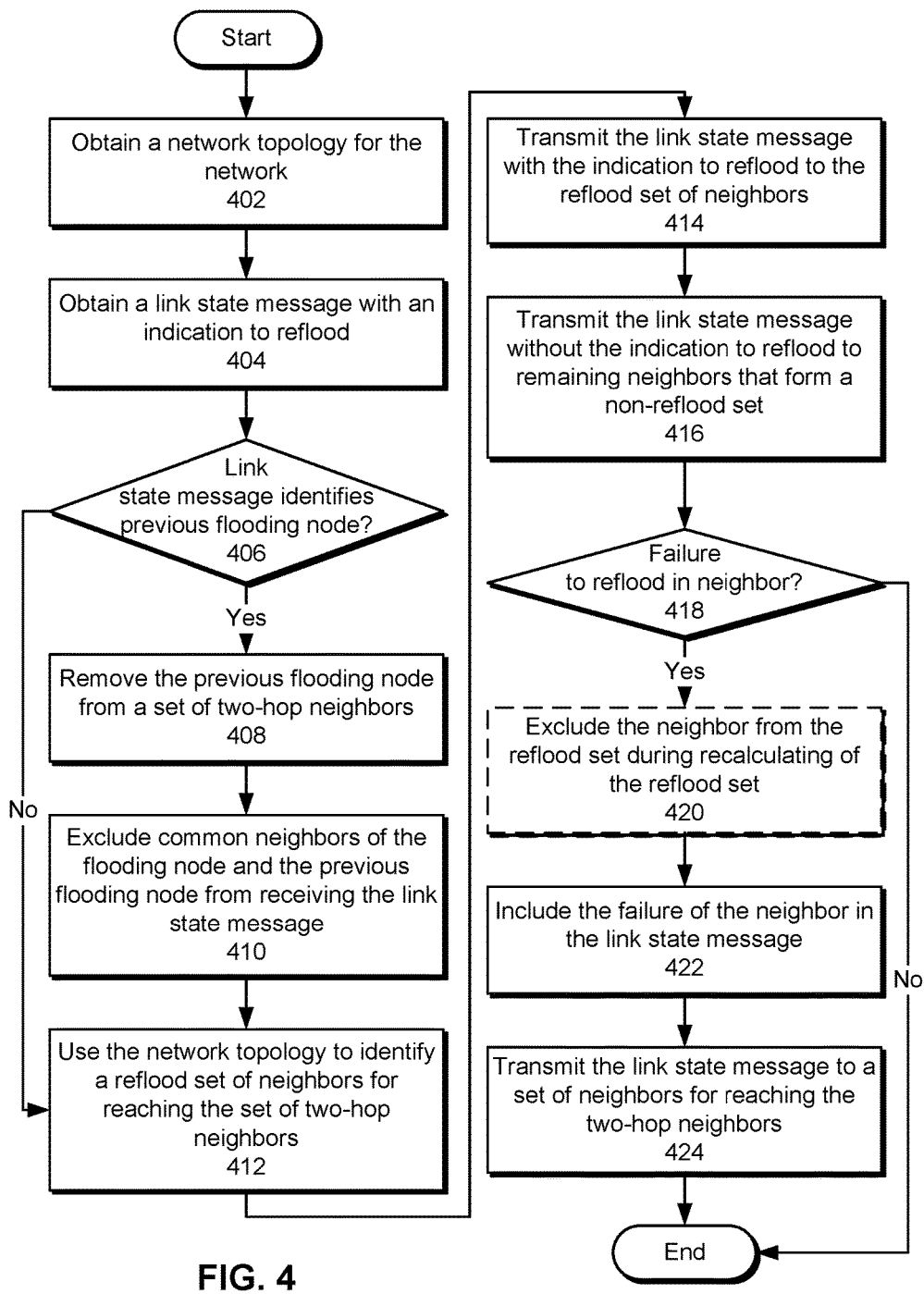
FIG. 4 shows a flowchart illustrating the process of transmitting a link state message in a network in accordance with the disclosed embodiments.

FIG. 4 shows a flowchart illustrating the process of transmitting a link state message in a network in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the technique.

Initially, a network topology for the network is obtained (operation 402). For example, the network topology may be generated using an initial flood of link state messages in the network, such as a flood of a link state message from each node in the network to every other node in the network. Next, a link state message with an indication to reflood is obtained (operation 404) by a node in the network. For example, the link state message may be generated by the node (e.g., if a change in connectivity is detected by the node), or the link state message may be received from a neighbor of the node. By specifying and/or obtaining the indication to reflood in the link state message, the node becomes a flooding node in the network.

The link state message may identify a previous flooding node (operation 406) from which the link state message originated. The previous flooding node may be a two-hop neighbor of the flooding node. If the link state message specifies a previous flooding node, the previous flooding node is removed from a set of two-hop neighbors (operation 408) of the flooding node, and common neighbors of the flooding node and the previous flooding node are excluded from receiving the link state message (operation 410). Operations 408-410 may be omitted if the link state message does not specify a previous flooding node that is a two-hop neighbor of the flooding node.

The network topology is then used to identify a reflood set of neighbors for reaching the set of two-hop neighbors (operation 412), as described in further detail below with respect to FIG. 5. After the reflood set is identified, the link state message with the indication to reflood is transmitted to the reflood set of neighbors (operation 414), and the link state message without an indication to reflood is transmitted to remaining neighbors that form a non-reflood set (operation 416). In turn, neighbors in the reflood set may operate as the flooding node, and neighbors in the non-reflood set may omit flooding of the link state message to other nodes.

A list of neighbors in the reflood set may optionally be stored for use in transmitting subsequent link state messages from the flooding node to the neighbors. For example, the flooding node may use the stored list to transmit a subsequent link state message with the indication to reflood to the reflood set of neighbors and the subsequent link state message without the indication to reflood to the remaining neighbors in the non-reflood set.

A failure to reflood in a neighbor may be detected (operation 418). For example, the failure to reflood may be detected when the neighbor does not acknowledge receipt of the link state message. If no failures to reflood are detected, no additional transmission of the link state message is required. If a failure to reflood is detected in a neighbor, the neighbor is optionally excluded from the reflood set during recalculating of the reflood set (operation 420). The failure of the neighbor is also included in the link state message (operation 422), and the link state message is transmitted to a set of neighbors for reaching the two-hop neighbors (operation 424). For example, the link state message may be transmitted with the indication to reflood to neighbors in the recalculated reflood set (e.g., to maintain efficiency). Alternatively, the link state message may be transmitted with the indication to reflood to all neighbors if the reflood set is not calculated (e.g., for fast convergence).

Figure 5:
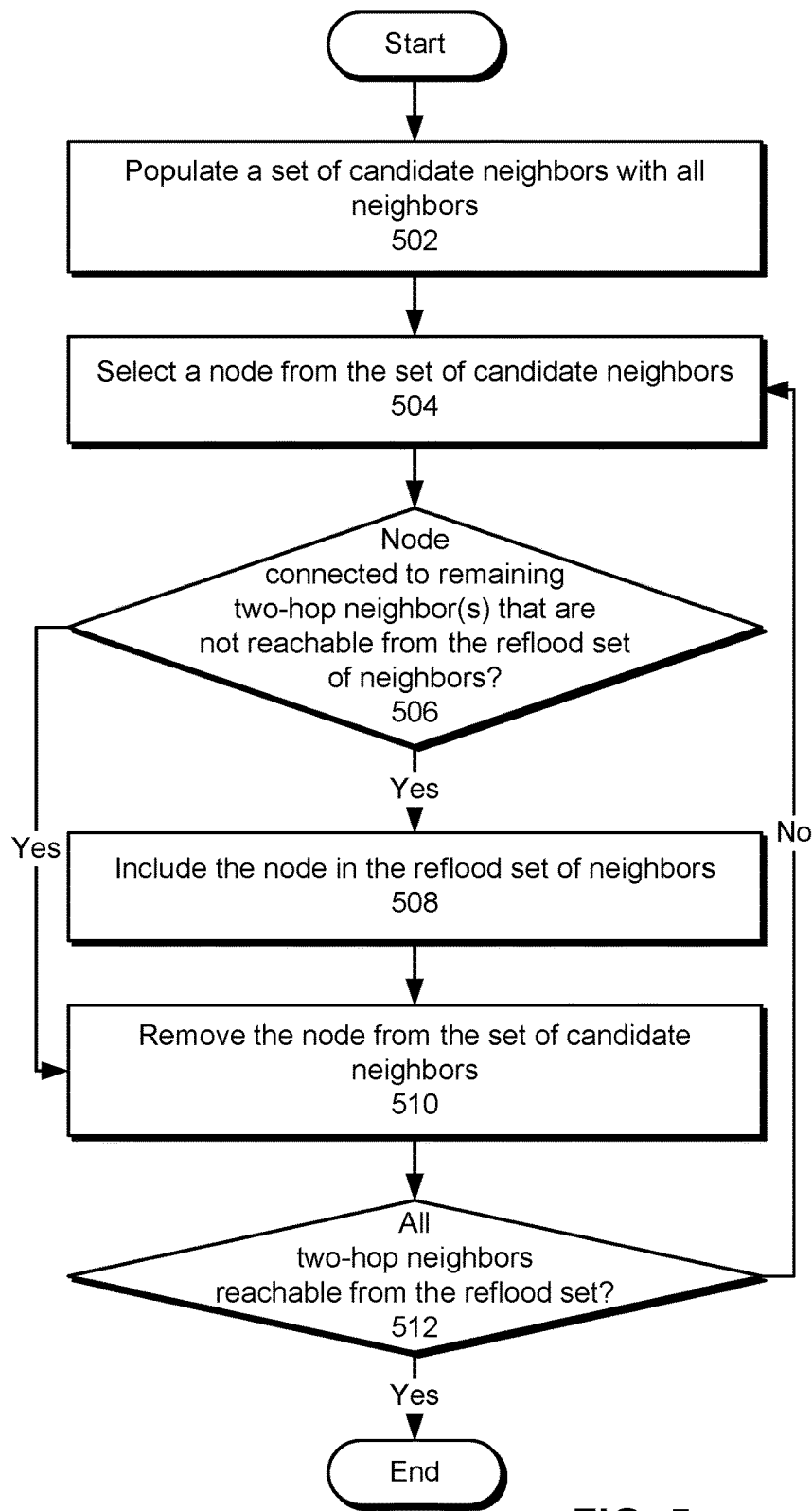
FIG. 5 shows a flowchart illustrating the process of identifying a reflood set of neighbors of a flooding node for reaching a set of two-hop neighbors of the flooding node in accordance with the disclosed embodiments.

FIG. 5 shows a flowchart illustrating the process of identifying a reflood set of neighbors of a flooding node for reaching a set of two-hop neighbors of the flooding node in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the technique.

First, a set of candidate neighbors is populated with all neighbors (operation 502) of the flooding node. As discussed above, the candidate neighbors may omit a previous flooding node and/or common neighbors between the flooding node and the previous flooding node. Next, a node is selected from the set of candidate neighbors (operation 504). For example, the node may be selected to have the lowest cost, highest fan-out to two-hop neighbors, and/or another value or metric to be optimized in the candidate set. To select the node with the lowest cost, the candidate set may be sorted from lowest cost to highest, and the node may be obtained as the first node in the sorted candidate set.

The node is then processed based on the connection of the node to one or more remaining two-hop neighbors that are not reachable from the reflood set of neighbors (operation 506). If the node is connected to any two-hop neighbors that are not reachable from the current reflood set, the node is included in the reflood set (operation 508) and removed from the set of candidate neighbors (operation 510). If the node is not connected to two-hop neighbors that are not reachable from the current reflood set, the node is removed from the set of candidate neighbors (operation 510) without adding the node to the reflood set. Operations 504-510 may be repeated until all two-hop neighbors are reachable from the reflood set (operation 512). In turn, remaining nodes in the candidate neighbors may be omitted from the reflood set.

Figure 6:
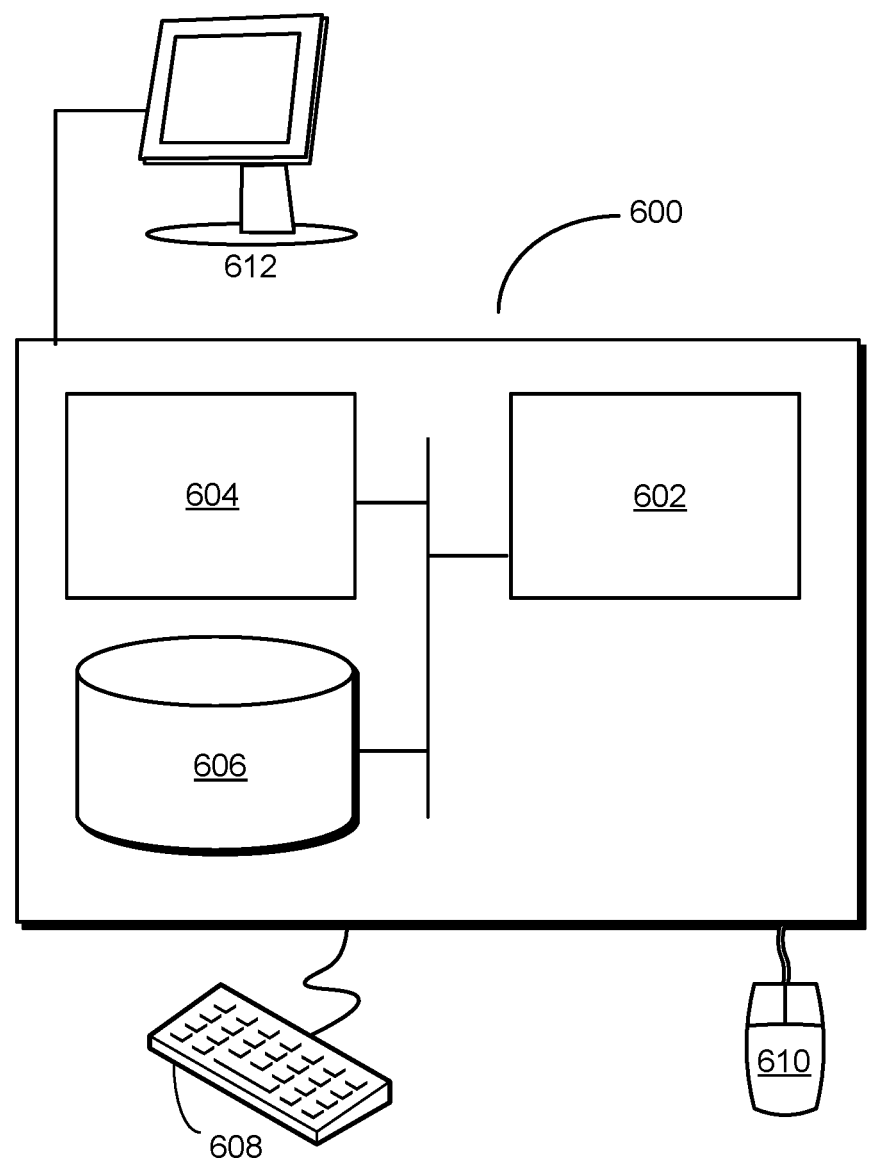
FIG. 6 shows a computer system in accordance with the disclosed embodiments.

FIG. 6 shows a computer system 600 in accordance with an embodiment. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for transmitting a link state message in a network. The system includes a flooding node in the network. The flooding node may obtain a network topology for the network and use the network topology to identify a reflood set of neighbors of the flooding node for reaching a set of two-hop neighbors of the flooding node. Next, the flooding node may transmit a link state message with an indication to reflood the link state message to the reflood set of neighbors. The flooding node may also transmit the link state message without the indication to reflood to remaining neighbors of the flooding node that form a non-reflood set.

In addition, one or more components of computer system 600 may be remotely located and connected to the other components over a network. Portions of the present embodiments (e.g., flooding node, neighbors, two-hop neighbors, etc.) may also be located on different nodes of a distributed system that implements the embodiments. For example, the present embodiments may be implemented using a cloud computing system that transmits link state messages to perform selective flooding of link state messages among a set of remote neighbors and/or two-hop neighbors.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
obtaining a network topology for a network comprising a set of nodes connected by a set of links;
obtaining a link state message with an indication to reflood at a flooding node in the network;
using the link state message to identify a previous flooding node from which the indication to reflood originated, wherein the previous flooding node is a two-hop neighbor of the flooding node;
using the network topology to identify, by a processor executing on the flooding node, a reflood set of neighbors of the flooding node for reaching a set of two-hop neighbors of the flooding node;
prior to identifying the reflood set of neighbors for reaching the set of two-hop neighbors of the flooding node:
removing the previous flooding node from the set of two-hop neighbors; and
excluding common neighbors of the flooding node and the previous flooding node from receiving the link state message from the flooding node;
transmitting, from the flooding node to the reflood set of neighbors, the link state message with an indication to reflood the link state message; and
transmitting, from the flooding node to remaining neighbors of the flooding node that form a non-reflood set, the link state message without the indication to reflood.

2. The method of claim 1, further comprising:
upon detecting a failure to reflood the link state message by a neighbor in the reflood set:
excluding the neighbor from the reflood set of neighbors during recalculating of the reflood set of neighbors; and
transmitting the link state message with the indication to reflood to the recalculated reflood set of neighbors.

3. The method of claim 2, further comprising:
including the failure of the neighbor in the link state message prior to transmitting the link state message to the recalculated reflood set of neighbors.

4. The method of claim 1, further comprising:
upon detecting a failure to reflood the link state message by a neighbor in the reflood set of neighbors, transmitting the link state message with the indication to reflood to all neighbors of the flooding node.

5. The method of claim 1, further comprising:
storing a list of neighbors in the reflood set at the flooding node;
using the stored list to transmit a subsequent link state message with the indication to reflood to the reflood set of neighbors; and
transmitting, to the remaining neighbors in the non-reflood set, the subsequent link state message without the indication to reflood.

6. The method of claim 1, wherein using the network topology to identify the reflood set of neighbors of the flooding node for reaching the set of two-hop neighbors of the flooding node comprises:
selecting a node from a set of candidate neighbors of the flooding node; and
including the node in the reflood set when the node is directly connected to one or more remaining two-hop neighbors of the flooding node that are not reachable from the reflood set of neighbors.

7. The method of claim 6, wherein using the network topology to identify the reflood set of neighbors of the flooding node for reaching the set of two-hop neighbors of the flooding node further comprises:
populating the set of candidate neighbors with all neighbors of the flooding node prior to selecting the node from the set of candidate neighbors; and
after the node is selected from the set of candidate neighbors, removing the node from the set of candidate neighbors.

8. The method of claim 6, wherein using the network topology to identify the reflood set of neighbors of the flooding node for reaching the set of two-hop neighbors of the flooding node further comprises:
discontinuing selection of nodes from the set of candidate neighbors when all nodes in the set of two-hop neighbors can be reached from the reflood set of neighbors.

9. The method of claim 6, wherein selecting the node from the set of candidate neighbors comprises:
selecting the node with a lowest cost in the set of candidate neighbors.

10. The method of claim 1, wherein obtaining the network topology comprises:

generating the network topology using an initial flood of link state messages in the network.

11. An apparatus, comprising:
one or more processors executing on a flooding node in a network comprising a set of nodes connected by a set of links; and
memory storing instructions that, when executed by the one or more processors, cause the apparatus to:
obtain a network topology for the network;
obtain a link state message with an indication to reflood at a flooding node in the network;
use the link state message to identify a previous flooding node from which the indication to reflood originated, wherein the previous flooding node is a two-hop neighbor of the flooding node;
use the network topology to identify a reflood set of neighbors of the flooding node for reaching a set of two-hop neighbors of the flooding node;
prior to identifying the reflood set of neighbors for reaching the set of two-hop neighbors of the flooding node:
remove the previous flooding node from the set of two-hop neighbors; and
exclude common neighbors of the flooding node and the previous flooding node from receiving the link state message from the flooding node;
transmit the link state message with an indication to reflood the link state message to the reflood set of neighbors; and
transmit the link state message without the indication to reflood to remaining neighbors of the flooding node that form a non-reflood set.

12. The apparatus of claim 11, wherein the memory further stores instructions that, when executed by the one or more processors, cause the apparatus to:
upon detecting a failure to reflood the link state message by a neighbor in the reflood set of neighbors:
exclude the neighbor from the reflood set of neighbors during recalculating of the reflood set of neighbors;
include a failure of the neighbor in the link state message; and
transmit the link state message with the indication to reflood to the recalculated reflood set of neighbors.

13. The apparatus of claim 11, wherein the memory further stores instructions that, when executed by the one or more processors, cause the apparatus to:
upon detecting a failure to reflood the link state message by a neighbor in the reflood set of neighbors, transmit the link state message with the indication to reflood to all neighbors of the flooding node.

14. The apparatus of claim 11, wherein using the network topology to identify the reflood set of neighbors of the flooding node for reaching the set of two-hop neighbors of the flooding node comprises:
selecting a node from a set of candidate neighbors of the flooding node; and
including the node in the reflood set when the node is directly connected to one or more remaining two-hop neighbors of the flooding node that are not reachable from the reflood set of neighbors.

15. The apparatus of claim 14, wherein using the network topology to identify the reflood set of neighbors of the flooding node for reaching the set of two-hop neighbors of the flooding node further comprises:
populating the set of candidate neighbors with all neighbors of the flooding node prior to selecting the node from the set of candidate neighbors; and after the node is selected from the set of candidate neighbors, removing the node from the set of candidate neighbors.

16. The apparatus of claim 14, wherein using the network topology to identify the reflood set of neighbors of the flooding node for reaching the set of two-hop neighbors of the flooding node further comprises:
discontinuing selection of nodes from the set of candidate neighbors when all nodes in the set of two-hop neighbors can be reached from the reflood set of neighbors.

17. A method, comprising:
obtaining a network topology for a network comprising a set of nodes connected by a set of links;
using the network topology to identify, by a processor executing on a flooding node in the network, a reflood set of neighbors of the flooding node for reaching a set of two-hop neighbors of the flooding node;
transmitting, from the flooding node to the reflood set of neighbors, a link state message with an indication to reflood the link state message; and
transmitting, from the flooding node to remaining neighbors of the flooding node that form a non-reflood set, the link state message without the indication to reflood;
wherein using the network topology to identify the reflood set of neighbors of the flooding node for reaching the set of two-hop neighbors of the flooding node comprises:
populating a set of candidate neighbors with all neighbors of the flooding node;
selecting a node from the set of candidate neighbors of the flooding node;
after the node is selected from the set of candidate neighbors, removing the node from the set of candidate neighbors; and
including the node in the reflood set when the node is directly connected to one or more remaining two-hop neighbors of the flooding node that are not reachable from the reflood set of neighbors.

18. The method of claim 17, further comprising:
obtaining the link state message with the indication to reflood at the flooding node;
using the link state message to identify a previous flooding node from which the indication to reflood originated, wherein the previous flooding node is a two-hop neighbor of the flooding node; and
prior to identifying the reflood set of neighbors for reaching the two-hop neighbors of the flooding node:
removing the previous flooding node from the set of two-hop neighbors; and
excluding common neighbors of the flooding node and the previous flooding node from receiving the link state message from the flooding node.

19. The method of claim 17, further comprising:
upon detecting a failure to reflood the link state message by a neighbor in the reflood set:
excluding the neighbor from the reflood set of neighbors during recalculating of the reflood set of neighbors; and
transmitting the link state message with the indication to reflood to the recalculated reflood set of neighbors.

20. The method of claim 17, further comprising:
upon detecting a failure to reflood the link state message by a neighbor in the reflood set of neighbors, transmitting the link state message with the indication to reflood to all neighbors of the flooding node.

* * * * *